United States Patent [19]

White

[11] Patent Number: 4,971,729

[45] Date of Patent: Nov. 20, 1990

[54] INORGANIC ION EXCHANGE MATERIAL

[75] Inventor: David A. White, London, England

[73] Assignee: British Nuclear Fuels plc, Warrington, England

[21] Appl. No.: 462,943

[22] Filed: Jan. 4, 1990

Related U.S. Application Data

[63] Continuation of Ser. No. 112,465, Oct. 26, 1987, abandoned.

[30] Foreign Application Priority Data

Oct. 27, 1986 [GB] United Kingdom ............... 8625656

[51] Int. Cl.$^5$ ................................................ C09K 3/00
[52] U.S. Cl. ..................................... 252/625; 252/184; 252/631; 210/682; 423/2; 423/6; 423/157; 423/181
[58] Field of Search ............... 252/184, 625, 631; 423/2, 6, 157, 181; 210/682

[56] References Cited

U.S. PATENT DOCUMENTS

| | | | |
|---|---|---|---|
| 3,157,601 | 11/1964 | Fitch et al. | 252/625 |
| 3,159,583 | 12/1964 | Fitch et al. | 252/625 |
| 3,312,633 | 4/1967 | Smith | 252/625 |
| 3,522,187 | 7/1920 | Kraus | 252/184 |
| 3,816,596 | 6/1974 | Wise | 252/625 |
| 3,879,523 | 4/1975 | Miyata et al. | 252/625 |
| 3,894,965 | 7/1975 | Foster et al. | 502/313 |
| 4,059,677 | 11/1977 | Sare et al. | 423/245.3 |
| 4,178,270 | 12/1979 | Fujita et al. | 252/184 |
| 4,507,396 | 3/1985 | Hickson | 502/64 |
| 4,661,282 | 4/1987 | Clark | 252/184 |
| 4,808,318 | 2/1989 | Komarneni | 210/682 |

FOREIGN PATENT DOCUMENTS

| | | |
|---|---|---|
| 3007716 | 9/1981 | Fed. Rep. of Germany . |
| 983175 | 2/1965 | United Kingdom . |
| 1268420 | 3/1972 | United Kingdom . |
| 1456456 | 11/1976 | United Kingdom . |
| 1501460 | 2/1978 | United Kingdom . |
| 1532664 | 11/1978 | United Kingdom . |
| 1555928 | 11/1979 | United Kingdom . |
| 2024790A | 1/1980 | United Kingdom . |
| 1568349 | 5/1980 | United Kingdom . |
| 2078704A | 1/1982 | United Kingdom . |

OTHER PUBLICATIONS

"Periodic Table of the Elements", from *Chem. & Eng. News*, 63 (5), 27, (1985).
Sargert, "Periodic Table of the Elements", (1962).

*Primary Examiner*—Edward A. Miller
*Attorney, Agent, or Firm*—Larson and Taylor

[57] ABSTRACT

An ion exchange material comprises an oxide of a first element selected from elements of Groups IVa, IVb, Va, Vb, VIa, VIb, VIIa, or lanthanide or actinide series of the Periodic Table, in combination with an oxide of at least one different element selected from elements of the afore-mentioned groups of the Periodic Table so as to form a composite material. For example, a composite ion exchange material may comprise silicon dioxide and manganese dioxide. By selecting the appropriate oxides a composite ion exchange material can be prepared which has greater mechanical and/or chemical stability than an individual oxide of the composite material.

7 Claims, No Drawings

INORGANIC ION EXCHANGE MATERIAL

This application is a continuation, of application Ser. No. 112,465 filed Oct. 26, 1987, now abandoned.

This invention relates to inorganic ion exchange materials and is particularly but not exclusively concerned with inorganic ion exchange materials for use with radioactive nuclei.

The waste produced in the nuclear industry, in operations such as reprocessing, contains radioactive nuclei having half-lives ranging from a few hours to thousands of years. Those nuclei having short half-lives do not present a problem since they decay to stable states during short periods of storage. However, those nuclei having long half-lives can present a problem since they take many years to decay and so require long term storage. Since the volumes of waste produced are large, it is desirable to remove the radioactive nuclei with long half-lives from the waste and store them separately, allowing the bulk of the waste to be safely disposed of.

One way of removing radioactive nuclei from the waste is to use ion exchange materials. Generally speaking ion exchange materials used in industry should be easy to prepare, have mechanical and chemical stability and different batches should have reproducible ion exchange properties. In addition to these general requirements ion exchange materials for use in the nuclear industry should be able to withstand high radiation fields and moderate temperatures. These requirements favour the use of inorganic ion exchange materials since organic materials tend to be radiologically degradable.

According to a first aspect of the present invention there is provided an inorganic ion exchange material, said ion exchange material comprising particles of a hydrous oxide of a first element selected from elements of Groups IVa, IVb, Va, Vb, VIa, VIb, VIIa, or lanthanide or actinide series of the Periodic Table, said particles of the first element being mixed with particles of a hydrous oxide of at least one different element selected from said Groups or series of the Periodic Table so as to form a permeable composite ion exchange material.

According to a second aspect of the present invention there is provided a method of preparing an inorganic ion exchange material, said method comprising dissolving derivatives of at least two different elements selected from Groups IVa, IVb, Va, Vb, VIa, VIb, VIIa or lanthanide or actinide series of the Periodic Table, converting the derivatives to oxides thereof, precipitating the oxides so produced together and drying the precipitate to give a composite ion exchange material comprising particles of a hydrous oxide of one said element mixed with particles of a hydrous oxide of the or each said different element.

According to a further aspect of the present invention there is provided a method of carrying out ion exchange on a solution, said method comprising contacting the solution with an ion exchange material of the first aspect of the invention or made by the method of the second aspect of the invention, the material being in a form suitable for carrying out ion exchange.

The numbers of the Groups of the Periodic Table used herein are those recommended by IUPAC up until 1985, such that titanium falls in Group IVa, manganese in Group VIIa and silicon in Group IVb.

The composite ion exchange material may be amorphous, and the said oxides may comprise dioxides.

The composite ion exchange material may comprise hydrous oxides of elements selected from the following lists: manganese, tin, uranium, and silicon; or manganese, tin, zirconium, uranium and titanium.

The composite ion exchange material may comprise silicon dioxide and manganese dioxide and may contain about 17% silicon dioxide. Other oxides, such as tin dioxide, may also be present.

The composite ion exchange material may comprise uranium dioxide and zirconium dioxide.

The derivatives of said elements may comprise salts of said elements.

Preferably, the method of preparation includes the addition of an oxidising or reducing agent so that at least one of the oxides is produced by changing the oxidation state of the element. For example a composite ion exchange material comprising silicon dioxide and manganese dioxide may be prepared by mixing a solution of potassium permanganate with a solution of sodium silicate, adding a reagent which acts as a reducing agent, such as hydrogen peroxide, oxalic acid, ethanol or formaldehyde, to give manganese dioxide and silicon dioxide and collecting the precipitate obtained. In the case where the ion exchange material includes uranium dioxide, the derivative of uranium may comprise a uranyl salt and a reducing agent of sodium dithionite or a zinc/mercury amalgam used to convert the uranyl salt to uranium dioxide.

At least one of said derivatives may be converted to the hydrous oxide thereof (or hydroxides) by alkaline or acid hydrolysis. The quantity of acid or alkali added may be chosen so that a pH of about 7 is obtained after hydrolysis.

The oxides may produce a colloidal suspension on precipitation which yields a non-crystalline floc. On drying the particles may link together to give the ion exchange material.

Desirably, the precipitate is washed to remove, at least in part, any impurities or by-products from the preparation. The conductivity of the washings may be monitored so as to indicate when the quantity of impurities being washed from the precipitate, and hence the purity of the precipitate, is at an acceptable level. Conveniently, washing is continued until the conductivity of the washings fall below a predetermined value, e.g., about 1000 $\mu$S.

The floc size may be reduced by the washing process, for example the floc size before washing may be of the order 100–60 $\mu$m and after washing of the order 60–20 $\mu$m.

Drying of the precipitate may be carried out at a temperature between 80° C. and 120° C.

By selecting the appropriate oxides composite ion exchange materials can be prepared which have greater mechanical and/or chemical stability than an individual oxide of the composite ion exchange material. This greater mechanical strength of the particles of the composite ion exchange material renders the pores in the material more accessible to the species to be adsorbed and hence gives a more favourable distribution coefficient. In contrast, particles of low mechanical strength tend to crumble in use resulting in the pores being closed off and hence a lower capacity for adsorption. For example, the combination of tin dioxide with manganese dioxide gives a composite ion exchange material having mechanical properties superior to manganese dioxide on its own.

An increase in the chemical stability of the composite ion exchange material can lead to an increase in the number of different species capable of being adsorbed. Combination of oxides to give a composite ion exchange material increases the pH range over which the ion exchange material can be used by decreasing the solubility of the components of the composite ion exchange material over that pH range. For example, silicon dioxide is stable at pH's down to 2, but manganese dioxide is unstable at pH's below about 6, whereas surprisingly a composite ion exchange material comprising silicon dioxide and manganese dioxide is stable over a greater pH range than that of manganese dioxide alone. For instance, such a composite ion exchange material is stable at pH 4.

The greater mechanical and chemical stability of the composite ion exchange materials is greater than that expected from a mere mixture of the components. It is believed that the unexpected increase in mechanical and chemical stability is due to interlinking of the oxide particles within the composite.

The particle sizes of the composite ion exchange materials obtained are large enough to allow handling on an industrial scale to be carried out easily, unlike some known ion exchange materials which tend to have smaller particle sizes.

It should be understood that ion exchange includes a process in which ions are removed from a solution by being adsorbed or absorbed by the ion exchange material.

The invention will now be further described, by way of example only, in the following illustrative experiments.

A composite ion exchange material comprising a combination of manganese dioxide and silicon dioxide is prepared by mixing a solution of potassium permanganate (3 g) in distilled water (250 mls) with a solution of sodium silicate in distilled water. The quantity of sodium silicate is selected so as to give the required percentage of silicon dioxide in the ion exchange material (see Table 1). Warming of the sodium silicate solution may be necessary to ensure that complete solubility is achieved. Hydrogen peroxide (6% w/v) is then added to the solution, obtained by mixing the potassium permanganate and sodium silicate solutions, until the precipitate becomes visibly flocculated. Addition of the hydrogen peroxide should be carried out cautiously as the reaction is spontaneous and exothermic. The precipitate is allowed to age for 24 hours, filtered and then washed with distilled water before drying in an oven overnight at a temperature of 80° C. A black solid is obtained and is ground to give the ion exchange material. If the filtrate is pink, potassium permanganate may still be present and it is advisable to retreat the precipitate with hydrogen peroxide before drying.

The hydrogen peroxide may be replaced by oxalic acid, formaldehyde, or an alcohol such as ethanol, the latter reagent being preferred on economic grounds.

To ensure that the washing stage removes substantially all of any salts generated as by-products during the preparation, conductivity measurements of the washings can be taken and the washing procedure repeated until consecutive washings have substantially the same conductivity and which is below a pre-determined value. e.g. 1000 μS. Alternatively the pH of or specific gravity of the washings can also be monitored.

TABLE 1

| Potassium Permanganate | Sodium Silicate | % of Silicon Dioxide in Ion Exchange Material | Weight of Ion Exchange Material Obtained |
|---|---|---|---|
| 3 g | 0 g | 0 | 1.69 g |
| 3 g | 0.5 g | 12 | 1.95 g |
| 3 g | 0.8 g | 17 | 2.02 g |
| 3 g | 1.0 g | 20 | 2.04 g |
| 3 g | 2.0 g | 34 | 2.13 g |
| 3 g | 3.0 g | 43 | 2.19 g |

The particle size distribution of the ground solid is shown in Table 2. The largest particle size fraction is directly proportional to the amount of silicon dioxide.

TABLE 2

| % $SiO_2$ (by weight) of TOTAL | PARTICLE SIZE (μm) | | | % TOTAL |
|---|---|---|---|---|
| | 600–420 | 420–250 | 250–90 | 600–90 μm |
| 0 | 26.6 | 33.1 | 40.3 | 82.3 |
| 12 | 32.1 | 32.1 | 35.8 | 84.6 |
| 17 | 32.7 | 32.7 | 34.6 | 86.8 |
| 20 | 32.9 | 32.4 | 34.7 | 83.3 |
| 34 | 33.7 | 34.8 | 31.5 | 87.8 |
| 43 | 34.9 | 34.9 | 30.2 | 89.0 |

The distribution coefficients, for strontium adsorption at a pH of about 9, for the various particle sizes is shown in Table. 3. It follows that the best composition is one with 17% of silicon dioxide i.e. a $MnO_2$: $SiO_2$ ratio of about 4.85.

TABLE 3

| % $SiO_2$ (by weight) of TOTAL | PARTICLE SIZE (μm) | | |
|---|---|---|---|
| | 600–420 | 420–250 | 250–90 |
| 0 | $6 \times 10^2$ | $1.2 \times 10^4$ | $7.6 \times 10^3$ |
| 12 | $2.5 \times 10^4$ | $1.3 \times 10^4$ | $1.7 \times 10^4$ |
| 17 | v high | $2.1 \times 10^4$ | v high |
| 20 | $5.9 \times 10^4$ | $2.9 \times 10^4$ | $1.2 \times 10^4$ |
| 34 | $4.6 \times 10^3$ | $1.6 \times 10^3$ | $4.5 \times 10^3$ |
| 43 | $4.8 \times 10^2$ | $5.6 \times 10^2$ | $3.1 \times 10^3$ |

The effectiveness of the ion exchange material is illustrated in Table 4 where the distribution coefficients for strontium adsorption of an ion exchange material with a $MnO_2$: $SiO_2$ ratio of about 4.85 are compared with commercially available $MnO_2$.

TABLE 4

| SOLUTION | $MnO_2$:$SiO_2$ Ion Exchange Material (420–250 μm particle size) | Commercially Available $MnO_2$ |
|---|---|---|
| 3.5 mg/l Sr | 49,000 | 1,800 |
| 35.0 mg/l Sr | 7,000 | 1,862 |
| 35.0 mg/l Sr 20 g/l Mg | 530 | 260 |

The increase in chemical stability of a composite ion exchange material formed from manganese dioxide and silicon dioxide is illustrated in Table 5. The composite ion exchange material (0.05 g) was contacted with water (20 mls) having a given pH, and the concentration of manganese in the water determined after 24 hours. For comparison, the experiment was repeated with commercially available manganese dioxide.

TABLE 5

| | Manganese Concentration (ppm) | |
|---|---|---|
| pH | $MnO_2:SiO_2$ Composite | Commercially Available $MnO_2$ |
| 7 | 0.2 | >25 |
| 8 | 0.1 | >25 |
| 9 | 0.1 | 0.3 |

From Table 5, it can be seen that manganese is leached much more slowly from the composite ion exchange material than from a material consisting of only manganese dioxide. It is believed that the surprisingly high chemical stability of the composite ion exchange material compared to manganese dioxide is due to the interlinking in the structure of the composite ion exchange material.

The stability of the composite ion exchange materials in aqueous solution is also illustrated by the case of a composite comprising uranium dioxide and zirconium dioxide. A composite ion exchange material comprising uranium dioxide and zirconium dioxide (50:50 by weight) was contacted with solutions of various pH and the quantity of uranium leached from the ion exchange material determined in each case. The following table gives the results obtained and compared them with the results for a material containing uranium dioxide only.

TABLE 6

| Soln. pH | Uranium in Solution (ppm) | |
|---|---|---|
| | Pure $UO_2$ | $UO_2:ZrO_2$ |
| 2 | 1400 | 21 |
| 3 | 110 | 14 |
| 4 | 4 | 29 |
| 5 | 3 | 29 |
| 6 | 4 | 13 |
| 7 | 2 | 21 |
| 8 | 9 | 13 |
| 9 | 8 | 8 |
| 10 | 13 | .4 |
| 11 | 35 | 10 |
| 12 | 20 | 2 |

The results show that the composite ion exchange material has greater chemical stability than uranium dioxide since the composite ion exchange material is stable at low pH's where the uranium dioxide is relatively unstable.

A series of composite ion exchange materials were prepared comprising titanium dioxide and silicon dioxide in various proportions. The distribution coefficients for these materials for caesium in an alkaline solution (pH 12.2) containing NaOH (0.7 g/l), $NaNO_3$ (1.9 g/l) and $NaNO_2$ (0.2 g/l) are given in the following table.

TABLE 7

| % $SiO_2$ in $TiO_2$ $SiO_2$ Composite | D.C for Caesium Sorbtion |
|---|---|
| 0 | 196 |
| 10 | 203 |
| 20 | 516 |
| 30 | 1334 |
| 40 | 1845 |
| 50 | 3720 |
| 100 | 760 |

The results illustrate that the distribution coefficient for the composite ion exchange materials is not a linear function of the composition of one of the components and that the composite ion exchange material can have a distribution coefficient which is superior to the individual components.

A composite ion exchange material comprising uranium dioxide and zirconium dioxide was prepared by mixing a solution of zirconium tetrachloride in nitric acid with a solution of uranyl nitrate in nitric acid. Sodium dithionite was added to reduce the uranyl salt. Quantities of zirconium tetrachloride and uranyl nitrate were chosen to give the required quantities of zirconium dioxide and uranium dioxide in the ion exchange material and the quantity of nitric acid employed chosen to give a pH of about 7.

A tin dioxide/silicon dioxide composite material was prepared by mixing titanium tetrachloride in nitric acid with tin tetrachloride.

Composites comprising titanium dioxide and silicon dioxide, and composites comprising tin dioxide and silicon dioxide were prepared mixing a solution of sodium silicate with a solution of titanium tetrachloride or tin tetrachloride as appropriate. Acid or alkali can be added to one of the solutions so that the final pH is about 7.

Washing with distilled water is carried out as with the manganese dioxide/silicon dioxide exchanger. Other salts apart from chlorides can be used.

The composites are prepared so that precipitation is slow and with efficient mixing.

Further results of comparisons of distribution coefficients for composite ion exchange materials and their individual components are given in the following table.

| Ion Exchange | Distribution Coefficient* | | | | Final pH |
|---|---|---|---|---|---|
| | Am-241 | Pu-242 | Sr-85 | Cs-134 | |
| $SiO_2$ | 608 | 803 | 360 | 184 | 10.1 |
| $TiO_2$ | ∞ | ∞ | 206 | | 10.3 |
| $UO_2$ | 409 | $3.7 \times 10^3$ | $1.4 \times 10^3$ | 431 | 4.7 |
| $TiO_2:SiO_2$ (50:50) | ∞ | ∞ | 1845 | 2470 | 9.6 |
| $UO_2:SiO_2$ (50:50) | $1 \times 10^3$ | $3.7 \times 10^3$ | $3.7 \times 10^3$ | $1.1 \times 10^3$ | 7.2 |

*Ion exchange materials were contacted with a solution having a pH of 1.7 and containing $NaNO_3$ (8.2 g/l), $HNO_3$ (0.5 g/l) and traces of Am-241, Pu-242, Sr-85 and Cs-134

In the preparation of the composite ion exchange materials a colloidal dispersion was obtained which gave a floc that was of smaller size than that obtained for individual components. For example, in the preparation of a composite ion exchange material comprising titanium dioxide and silicon dioxide the floc size was of the order of 25-36 μm, and in the preparation of a titanium dioxide alone it was found to be 42-92 μm. It is believed that the presence of the second component encourages the smaller size flocs obtained for composite ion exchange materials. It is also thought that in the preparation of a composite ion exchange material a particle is formed comprising a core of one oxide having a layer of the other oxide on its surface. On drying the layer shrinks to uncover parts of the surface and particles link together.

The ion exchange materials might comprise particles of a hydrous oxgyen-containing compound of a first element selected from Groups IVa, IVb, Va, Vb, VIa, VIb, VIIa, or lanthanide or actinide series of the Periodic Table mixed with a hydrous oxygen-containing compound of at least one different element selected from said Groups or said series. For example, the ion exchange material might include a uranite salt produced for example during precipitation of hydrous uranium oxide with sodium hydroxide.

It should also be appreciated that the composite ion exchange materials are not restricted to the adsorption of strontium as other species, such as caesium and americium, may be removed. Furthermore, it is envisaged that the composite ion-exchange materials may be used in industries other than the nuclear industry to adsorb ions other than radioactive ions.

I claim:

1. A solid particulate ion-exchange material consisting essentially of co-precipitated hydrous manganese dioxide and hydrous silicon dioxide, the silicon dioxide being present in an amount of from 12 to 20% by weight of the material.

2. An ion-exchange material as claimed in claim 1 wherein said material is amorphous.

3. An ion-exchange material as claimed in claim 1 containing about 17% by weight of silicon dioxide.

4. An ion exchange material as claimed in claim 1 and made by a method which comprises mixing a solution of potassium permanganate with a solution of sodium silicate, the quantity of sodium silicate being selected so as to give the required percentage of silicon dioxide in the ion-exchange material, adding a reducing agent to the mixed said solutions until a precipitate becomes visibly flocculated, the precipitate being allowed to age, filtering the aged precipitate, washing the precipitate to remove substantially all salt by-products, measuring the conductivity of the filtrate and repeating the washing until consecutive filtrates have substantially the same conductivity below 1000 micro Siemens, drying the precipitate at a temperature of about 80° C., and grinding the precipitate to give the required ion-exchange material.

5. An ion-exchange material as claimed in claim 4, wherein the quantity of sodium silicate is selected to give about 17% by weight of silicon dioxide in the ion-exchange material.

6. A method of carrying out ion exchange on a solution, the method comprising contacting the solution with the inorganic ion exchange material as claimed in claim 1.

7. A method as claimed in claim 6, wherein the solution includes ion of americum, or plutonium, or strontium, or caeium, or combinations thereof.

* * * * *